ns Patent [19]

Asada et al.

[11] 4,273,905
[45] * Jun. 16, 1981

[54] PROCESS FOR PRODUCING PROPYLENE POLYMER OR COPOLYMER

[75] Inventors: Mamoru Asada; Akinobu Shiga; Kiyoshi Matsuyama; Masahiro Kakugo, all of Ehime, Japan

[73] Assignee: Sumitomo Chemical Co., Ltd., Osaka, Japan

[*] Notice: The portion of the term of this patent subsequent to Oct. 31, 1995, has been disclaimed.

[21] Appl. No.: 1,651

[22] Filed: Jan. 8, 1979

Related U.S. Application Data

[63] Continuation-in-part of Ser. No. 814,579, Jul. 11, 1977, abandoned.

[30] Foreign Application Priority Data

Jul. 9, 1976 [JP] Japan ............................ 51-82374

[51] Int. Cl.³ .......................... C08F 4/66; C08F 10/06
[52] U.S. Cl. ............................ 526/142; 252/429 B; 526/119; 526/141; 526/351; 526/902
[58] Field of Search ............................ 526/119, 142

[56] References Cited

U.S. PATENT DOCUMENTS

| | | | |
|---|---|---|---|
| 3,622,552 | 11/1971 | Fukuda et al. | 526/142 |
| 3,825,524 | 7/1974 | Wada et al. | 526/142 |
| 3,960,765 | 6/1976 | Shiga et al. | 526/142 |
| 3,984,350 | 10/1976 | Karayannis et al. | 526/142 |
| 4,053,697 | 10/1977 | Asada et al. | 526/142 |
| 4,123,387 | 10/1978 | Shiga et al. | 526/142 |
| 4,136,243 | 1/1979 | Appleyard et al. | 526/142 |

FOREIGN PATENT DOCUMENTS 1128090 9/1968 United Kingdom ............... 526/142

*Primary Examiner*—Edward J. Smith
*Attorney, Agent, or Firm*—Sughrue, Rothwell, Mion, Zinn and Macpeak

[57] ABSTRACT

A process for producing a propylene polymer or copolymer which comprises polymerizing (a) propylene or (b) a mixture of propylene and another unsaturated hydrocarbon monomer in liquid propylene in the presence of a catalyst system of (A) a specified titanium trichloride composition obtained by reducing titanium tetrachloride with an organoaluminum compound and activating the product;

(B) an organoaluminum compound having the general formula $R_2AlX$ wherein R represents an alkyl group or an aralkyl group, each containing up to 18 carbon atoms, and X represents a halogen atom; and (C) an unsaturated carboxylic acid ester; while adjusting the amount of the polymer produced to at least 8,000 g per gram of the titanium trichloride composition.

7 Claims, 2 Drawing Figures

PROCESS FOR PRODUCING PROPYLENE POLYMER OR COPOLYMER

CROSS-REFERENCE TO THE RELATED APPLICATION

This application is a continuation-in-part application of U.S. Patent Application Ser. No. 814,579, filed July 11, 1977, now abandoned entitled "Process for Producing Polypropylene Polymer or Copolymer".

BACKGROUND OF THE INVENTION

1. Field of the Invention

This invention relates to a process for producing a propylene polymer or copolymer. More specifically, the invention relates to a commercially advantageous process for producing a propylene polymer or copolymer by polymerizing or copolymerizing propylene in liquid propylene (to be referred to hereinafter sometimes as "bulk polymerization").

2. Description of the Prior Art

Bulk polymerization methods are well known and have come into widespread commercial use. On comparison with a polymer slurry which is obtained in a conventional suspension (or solution) polymerization method (to be referred to hereinafter as the conventional solution polymerization method) using a liquid saturated hydrocarbon containing at least 5 carbon atoms, preferably 5 to 7 carbon atoms, as a solvent, the polymer slurry obtained in bulk polymerization has the advantage that the polymer can be very easily separated from the unsaturated hydrocarbon monomer (mainly propylene) solvent by simply subjecting the polymer slurry to a reduced pressure, because the unsaturated hydrocarbon monomer has a higher vapor pressure and is readily volatilizable.

However, the polymer obtained in such a bulk polymerization method generally has the disadvantage that it contains large quantities of a polymer soluble in boiling n-heptane and the catalyst residue. Generally, bulk polymerization has a higher rate of polymerization than conventional solution polymerization, and can be operated under conditions at which the catalyst efficiency is good. Thus, intrinsically, reduced residual catalyst results in the bulk polymerization method.

Accordingly, if under such conditions, a step of post-treating the polymerization reaction mixture for removal of the boiling n-heptane-soluble polymer could be eliminated, its economic effect would be very great. Polymers obtained by such a method have one or more of the defects mentioned below, and have inferior quality and economic value from a commercial standpoint.

For example, when a catalyst system composed of titanium trichloride and triethylaluminum is used, the polymer obtained by the above method contains only 75 to 85% by weight of a polymer insoluble in boiling n-heptane. With a catalyst system of titanium trichloride and diethylaluminum chloride, the amount of the insoluble polymer is 85 to 95%. Since such polymers have poor rigidity and antiblocking property, they cannot be used in applications which require relatively good characteristics, for example, in forming films or fibers, although they can be used for general molding purposes. In order to improve the characteristics of the polymer, the general practice is to contact the polymer slurry withdrawn from the polymerization system, or the polymer separated from the slurry by separation of the unsaturated hydrocarbon monomer (mainly propylene) at reduced pressure, with a suitable catalyst-decomposing agent and to wash the polymer with a solvent consisting mainly of a saturated hydrocarbon containing at least 5 carbon atoms, preferably 5 to 7 carbon atoms, or a liquid unsaturated hydrocarbon monomer (mainly liquid propylene) which is the same as the polymerization system, thereby extracting and removing the solvent-soluble polymer and a part of the residual catalyst.

Suitable catalyst-decomposing agents serve to stop the polymerization reaction by decomposing the active catalyst or forming a complex with the catalyst, thereby inhibiting the formation of a high molecular weight polymer which markedly degrades the properties of the final polymer, and also rendering the catalyst readily extractable by a solvent in the subsequent washing step. Generally, catalyst-decomposing agents include various alcohols, ethers, ketones and chelating agents which may, if desired, be diluted with suitable diluents (generally, the same solvent used in the above steps is employed as a diluent).

Methods have also been suggested to reduce the amount of polymer which is soluble in the polymer slurry in the polymerization system. They include, for example, a method which involves using a stereospecific catalyst system such as a complex of a titanium halide and an aluminum halide, a method which involves adding various compounds to be described below as a third component to the above catalyst system or polymerization system, and a method which involves suitably changing the polymerization conditions, for example, decreasing the polymerization temperature. According to these methods, however, the amount of the polymer soluble in the polymer slurry is still fairly large, and it is difficult to omit the step of removing the soluble polymer.

Previously it was noted that when a polymer slurry obtained by bulk polymerization was treated with liquid propylene as a washing solvent in a countercurrent-type washing tower, the polymer dissolved in the slurry, that portion of the residual catalyst which was dissolved in the polymer slurry, and a part of the residual catalyst which is precipitated in the polymer slurry can be easily separated. This led to the discovery of commercially advantageous methods for producing a propylene polymer or copolymer (e.g., as disclosed in Japanese Patent Application (OPI) Nos. 79589/75, 139986/76 and 3679/77, and U.S. Pat. No. 4,053,697).

These methods, however, tend to give rise to a problem when a very high level of purity beyond that generally in current commercial demand is required.

For example, film-grade polypropylene, which accounts for a great proportion of the uses of polypropylene, having an increased content of a polymer with a low degree of stereo-regularity, suffers from the defect that a film prepared therefrom sticks to itself ("blocking phenomenon"), and becomes useless.

There is a good correlation between the blocking phenomenon and the content of the cold xylene-soluble portion (to be abbreviated hereinafter as CXS (%) and determined as hereinafter described) of the resulting polymer. FIG. 1 of the accompanying drawings shows the relationship between CXS (%) and blocking in a propylene homopolymer and a random copolymer of propylene and ethylene (ethylene content: 2.5 to 4% by weight). The solid line shows the relationship for the homopolymer, and the broken line shows the relationship for the random copolymer. In order to reduce blocking to a practically permissible degree (30 g/100 cm$^2$), it is necessary to adjust the CXS (%) to about 3 to 4% or less for the homopolymer, and 4 to 5% or less for the random copolymer. The CXS (%) has been chosen as a measure of the content of a polymer with a low degree of stereoregularity, because it has been found that a definite relationship does not always exist between the content of the boiling n-heptane-soluble portion which has been heretofore widely used, and blocking. For example, some polymers have a small CXS (%) and reduced blocking even when their content of the boiling n-heptane-soluble portion is large, and others show quite a contrary relationship.

SUMMARY OF THE INVENTION

An object of this invention, therefore, is to provide an improved process for producing a polymer or copolymer of propylene which has an increased purity over those attained by the conventional methods described above.

According to the present invention, the invention provides a process for producing a propylene polymer or copolymer which comprises polymerizing propylene alone or a mixture of propylene with another unsaturated hydrocarbon monomer copolymerizable with propylene under suitable polymerization conditions such that the propylene is maintained in the liquid phase, using one or more polymerization reactors batchwise, semi-batchwise or preferably continuously, in the presence of a catalyst system comprising (A) a specified titanium trichloride composition obtained by reducing titanium tetrachloride with an organoaluminum compound and activating the resulting product;

(B) an organoaluminum compound of the general formula $$R_2AlX$$

wherein R is an alkyl group or an aralkyl group, each containing up to 18 carbon atoms, and X is a halogen atom; and (C) an unsaturated carboxylic acid ester; with the amount of the polymer being adjusted to at least about 8,000 g per gram of the titanium trichloride composition (A).

DETAILED DESCRIPTION OF THE INVENTION

It is known to reduce the amount of by-product polymer soluble in boiling n-heptane (generally called atactic polymer) by adding Lewis base as a third component to the titanium trichloride composition and the organoaluminum compound (e.g., as disclosed in Japanese Patent Publication No. 4832/74).

However, the addition of a third component causes a decrease in the rate of polymerization, and the smaller the amount of the by-product soluble polymer, the slower the rate of polymerization becomes.

Figure 2:
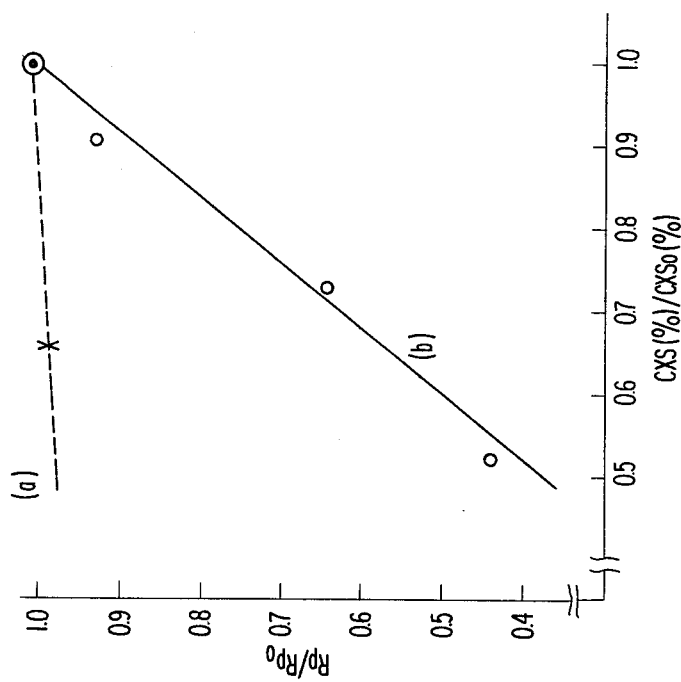
FIG. 2 shows the ratio [$R_p/R_{po}$] of the rate of polymerization of propylene in the presence of methyl methacrylate $R_p$ to the rate of polymerization of propylene in the absence of methyl methacrylate $R_{po}$ versus the ratio [CXS (%)/CXS$_o$ (%)] of the CXS (%) of the polymer obtained in the presence of methyl methacrylate to the CXS$_o$ (%) of the polymer obtained in the absence of methyl methacrylate, using a three-component catalyst composed of a titanium trichloride composition obtained by reducing titanium tetrachloride with metallit aluminum and pulverizing the product, diethyl aluminum chloride and methyl methacrylate [solid line (b)] and the relationship between the ratio [$R_p/R_{po}$] of the rate of polymerization of propylene in the presence of methyl methacrylate to the rate of polymerization of propylene in the absence of methyl methacrylate versus the ratio [CXS (%)/CXS$_o$ (%)] of the CXS (%) of the polymer obtained in the presence of methyl methacrylate to the CXS$_o$ (%) of the polymer obtained in the absence of methyl methacrylate, using a three-component catalyst composed of a titanium trichloride composition obtained by reducing titanium tetrachloride with an organoaluminum compound and activating the product obtained.
Figure 1:
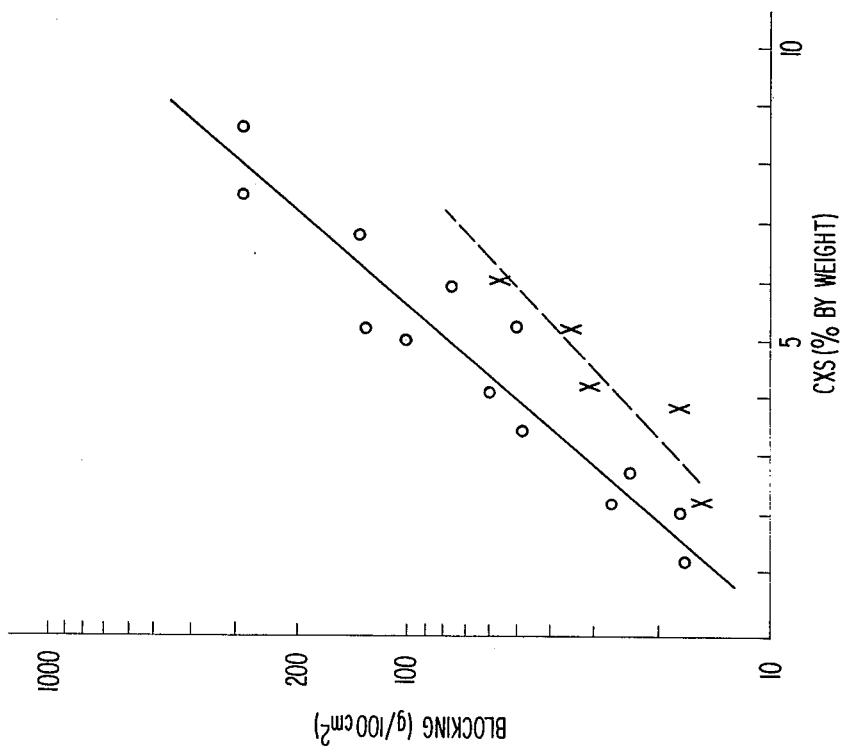
FIG. 1 shows the relationship between CXS (%) and blocking value for a propylene homopolymer (solid line) and for a propylene-ethylene random copolymer (broken line).

In FIG. 2, line (b) shows the ratio [$R_p/R_{po}$] of the rate of polymerization (to the rate of polymerization where methyl methacrylate was not added) versus the ratio [CXS (%)/CXS$_o$ (%)] (to CXS$_o$ (%) where methyl methacrylate was not added) in the polymerization of propylene using a three-component catalyst composed of a titanium trichloride composition (TiCl$_3$AA) obtained by reducing titanium tetrachloride with metallic aluminum and pulverizing the product in a ball mill, diethylaluminum chloride, and methyl methacrylate. In FIG. 2, line (b) indicates that when the CXS (%) is reduced to half, the rate of polymerization decreases to less than 50%. In FIG. 2, line (a) shows the relationship between the ratio [$R_p/R_{po}$] of the rate of polymerization and the ratio of CXS (%) [CXS (%)/CXS$_o$ (%)] which is observed when the titanium trichloride composition is a titanium trichloride composition obtained by reducing titanium tetrachloride with an organoaluminum compound and activating the product. It is seen from line (a) in FIG. 2 that there is hardly any decrease in the rate of polymerization even when the CXS (%) is reduced to half.

Extensive investigations were made in order to overcome this difficulty, and a method has now been discovered which can be used to reduce the formation of soluble polymer as a by-product without decreasing the rate of polymerization by limiting both the catalyst system and the third component. This discovery led to the accomplishment of the present invention.

It has now been ascertained that not all known Lewis bases are suitable for use together with the activated titanium trichloride composition used in this invention. For example, when tributylamine, vinylpyridine, trilauryl phosphite, and tetramethyl urea are used as the Lewis bases, the catalyst has markedly reduced activity, and cannot be used in the present invention. It has been found, however, that when a specified unsaturated carboxylic acid ester is used as the Lewis base together with the activated titanium trichloride composition, the amount of by-product soluble polymer can be reduced without decreasing the activity of the catalyst. This fact is surprising and unexpected from known facts relative to this type of polymerization.

In order for the amount of the residual catalyst in the resulting polymer to be sufficiently small that the amount does not adversely affect the product polymer, the polymerization must be carried out with a high catalyst efficiency (corresponding to a yield of the polymer of at least about 8,000 g per gram of the catalyst). If the catalyst efficiency is below about 8,000 g, the color, heat stability, and light resistance of the pellets of the polymer are degraded, and the polymer is useless in practical applications.

It is necessary that the activated titanium trichloride composition as catalyst component (A) should start from a solid material obtained by reducing titanium tetrachloride with an organoaluminum compound. If desired, catalyst component (A) may be obtained by treating the reduced solid titanium compound successively with an ether, an organoaluminum compound, and a mixture of a halogenated hydrocarbon and an ether as disclosed in U.S. Patent Application Ser. No. 777,269, filed Mar. 14, 1977 now U.S. Pat. No. 4,123,387 (Japanese Patent Application No. 28313/76). Alternatively, the reduced solid titanium compound is treated with an ether and then with titanium tetrachloride as disclosed in U.S. Pat. No. 4,053,697, and British Pat. No. 1,391,067. The respective disclosures of U.S. Patent Application Ser. No. 777,269, filed Mar. 14, 1977, now U.S. Pat. No. 4,123,387 and the U.S. Pat. No. 4,053,697 are hereby incorporated by reference and relied upon.

That is, the titanium trichloride composition (A) is a composition (a) obtained by reducing titanium tetrachloride with an organoaluminum compound of the general formula $$R'_nAlX'_{3-n}$$

wherein R' represents a straight chain or branched chain alkyl group, an alicyclic hydrocarbon group or an aromatic hydrocarbon group, each containing up to 18 carbon atoms, X' represents a halogen atom or a hydrogen atom, and n is a number of $1 \leq n \leq 3$; treating the resulting solid reduction product with an ether; contacting the resulting ether-treated solid with an aluminum compound having the general formula $$R''_pAlX_{3-p}$$

wherein R'' represents a straight chain or branched chain alkyl group, an alicyclic hydrocarbon group or an aromatic hydrocarbon group, each containing up to 18 carbon atoms, X represents a halogen atom, and p is a number of $1 \leq p < 1.5$; and thereafter contacting the treated solid with a mixture of a halogenated hydrocarbon and an ether, a composition (b) obtained by reducing titanium tetrachloride with an organoaluminum compound of the general formula $$R'_nAlX'_{3-n}$$

wherein R' represents a straight chain or branched chain alkyl group, an alicyclic hydrocarbon group or an aromatic hydrocarbon group, each containing up to 18 carbon atoms, X' represents a halogen atom or a hydrogen atom, and n is a number of $1 \leq n \leq 3$; treating the resulting solid reduction product with an ether; contacting the resulting ether-treated solid with an aluminum compound of the general formula $$R''_pAlX_{3-p}$$

wherein R'' represents a straight chain or branched chain alkyl group, an alicyclic hydrocarbon group or an aromatic hydrocarbon group, each containing up to 18 carbon atoms, X represents a halogen atom, and p is a number of $1 \leq p < 1.5$ in the presence of an organic halogen compound of the general formula $$R'''X$$

wherein R''' represents a straight chain alkyl group, an alicyclic hydrocarbon group or an aromatic hydrocarbon group, each containing up to 18 carbon atoms, and X represents a halogen atom; and thereafter contacting the resulting solid with a mixture of a halogenated hydrocarbon and an ether, or a composition (c) obtained by reducing titanium tetrachloride with an organoaluminum compound of the general formula $$R'_nAlX'_{3-n}$$

wherein R' represents a straight chain or branched chain alkyl group, an alicyclic hydrocarbon group or an aromatic hydrocarbon group, each containing up to 18 carbon atoms, X' represents a halogen atom or a hydrogen atom, and n is a number of $1 \leq n \geq 3$; treating the resulting solid reduction product with an ether; and reacting the ether-treated solid with titanium tetrachloride solution of at least 35% by volume in an inert hydrocarbon solvent.

The methods for preparing the above-described titanium trichloride composition used in the present invention will be described below.

Titanium tetrachloride is reduced with an organoaluminum compound.

Examples of organoaluminum compounds of the formula:

$$R'_nAlX'_{3-n}$$

wherein R' is a straight or branched alkyl group, an alicyclic group or an aromatic hydrocarbon group, each having up to 18 carbon atoms, X' is a halogen atom or a hydrogen atom, and n satisfies the relationship $1 \leq n \leq 3$, which can be used to produce the solid reduction product include: methylaluminum dichloride, ethylaluminum dichloride, n-propylaluminum dichloride, methylaluminum sesquichloride, ethylaluminum sesquichloride, dimethylaluminum chloride, diethylaluminum chloride, di-n-propylaluminum chloride, trimethylaluminum, triethylaluminum, triisobutylaluminum, ethyl dicyclohexylaluminum, triphenylaluminum, diethylaluminum hydride, diisobutylaluminum hydride, diethylaluminum bromide, diethylaluminum iodide. Of these compounds, diethylaluminum chloride and ethylaluminum sesquichloride produce particularly preferred results.

The reduction of the titanium tetrachloride is carried out at about $-100°$ to about $60°$ C., preferably $-30°$ to $30°$ C. This reduction is preferably carried out in an inert hydrocarbon solvent (e.g., pentane, hexane, heptane, octane, decane, etc.).

In the production of titanium trichloride composition (a), (b) or (c), the catalytic treatment with an ether is carried out.

Preferred ethers which can be used herein are compounds of the formula:

$$R_1-O-R_2$$

wherein $R_1$ and $R_2$, which may be the same or different, each is a straight or branched alkyl group, an alicyclic group or an aromatic hydrocarbon group, each having up to 10 carbon atoms.

Where the catalytic treatment with the ether is conducted twice, the ether used in the first treatment may be the same as or different from that used in the second treatment.

Specifically, the following ether compounds are examples of ethers which can be used: diethyl ether, di-n-propyl ether, diisopropyl ether, di-n-butyl ether, diisoamyl ether, dineopentyl ether, di-n-hexyl ether, di-n-octyl ether, diphenyl ether, di-o-tolyl ether, di-p-tolyl ether, dicyclohexyl ether and the like. Preferred compounds of these compounds are those in which $R_1$ and $R_2$ are both an alkyl group. Particularly preferred ethers are di-n-butyl ether and diisoamyl ether.

The treatment of the solid reduction product with the ether is advantageously carried out in the presence of a diluent. Preferred diluents are inert hydrocarbon solvents such as hexane, heptane, octane, decane, decalin, benzene, toluene and xylene, etc.

The amount of the ether used is about 0.05 to about 3 times on a molar basis, preferably 0.5 to 1.5 times on a molar basis, the amount of the titanium trichloride contained in the solid product to be treated with the ether. Preferred treating temperatures range from about 0° to about 100° C. The treating time is not particularly limited, but it is preferably ⅓ to 5 hours.

In the production of titanium trichloride composition (a) or (b), ether-treated solid product thereof is catalytically treated with an aluminum compound of the formula:

$$R''_p AlX_{3-p}$$

wherein $R''$ is a straight or branched alkyl group, an alicyclic group or an aromatic hydrocarbon group, each having up to 18 carbon atoms, X is a halogen atom, and p satisfies the relationship $1 \leq p < 1.5$. Alkylaluminum dihalides are preferred as such a compound, and of these, alkylaluminum dichlorides produce particularly preferred results.

Specifically, examples of such compounds include the following: methylaluminum dichloride, ethylaluminum dichloride, n-propylaluminum dichloride, n-butylaluminum dichloride, n-octylaluminum dichloride, phenylaluminum dichloride, o-tolylaluminum dichloride, cyclohexylaluminum dichloride, methylaluminum dibromide, ethylaluminum dibromide, phenylaluminum dibromide, methylaluminum diiodide and the like. These aluminum compounds may be used individually or as a mixture of two or more compounds. Of these, ethylaluminum dichloride produces particularly preferred results.

The amount of the aluminum compound used is not particularly limited, but it is preferably about 0.1 to about 10 times on a molar basis, particularly preferably 0.5 to 5 times on a molar basis, the amount of titanium trichloride contained in the solid product.

The above-described treatment may be carried out in the absence of or presence of a diluent. Preferred diluents are inert hydrocarbon solvents such as hexane, heptane, octane, decane, decalin, benzene, toluene, xylene and the like.

The treating temperature is not particularly limited, but it generally ranges from about room temperature (e.g., 20°-30° C.) to about 200° C. and preferably 50° to 180° C. The treating time is also not particularly limited, but it is preferably 0.5 to 5 hours, in general.

In the production of titanium trichloride composition (b), organo-halogen compounds of the formula:

$$R'''X$$

wherein $R'''$ is a straight or branched alkyl group, an alicyclic group or an aromatic hydrocarbon group, each having up to 18 carbon atoms, and X is a halogen atom, are used. Of these compounds, those in which $R'''$ is an alkyl group or an aralkyl group produce preferred results.

Specifically, suitable examples of organo-halogen compounds which can be used include: methyl chloride, ethyl chloride, methyl bromide, ethyl bromide, n-propyl chloride, n-butyl chloride, n-butyl bromide, tert-butyl chloride, sec-butyl chloride, chlorocyclohexane, chlorobenzene, bromobenzene, benzyl chloride, benzyl bromide and the like. The amount of the organo-halogen compound used is not particularly limited, but generally ranges from about 0.01 to about 1 mol, preferably 0.05 to 0.5 mol, per mol of the aluminum compound of the formula:

$$R''_p AlX_{3-p}$$

In the production of titanium trichloride composition (a) or (b), the thus-treated solid is catalytically treated with a mixture of a halogenated hydrocarbon and an ether. Halogenated hydrocarbons which can be used are represented by the formula:

$$CH_q X_{4-q}$$

wherein X is a halogen atom and q is an integer satisfying the relationship $0 \leq q < 4$. Specifically, carbon tetrachloride, chloroform, methylene chloride, carbon tetrabromide, bromoform, methylene bromide and mixtures thereof are exemplified. Of them, carbon tetrachloride is most preferred.

The above-described treatment may be carried out in the absence of or presence of an inert hydrocarbon solvent (e.g., hexane, heptane, octane, decane, benzene, toluene, xylene, etc.) as a diluent. This catalytic treatment may also be carried out using a ball mill.

The amount of the halogenated hydrocarbon used depends upon the properties of the titanium trichloride compositions and the conditions of the catalytic treatment. The amount is generally, however, about 0.001 to about 1.0 times on a molar basis, preferably 0.003 to 1.0 times on a molar basis, based on the amount of titanium trichloride contained in the titanium trichloride composition.

When the molar amount is less than about 0.001 times, the effect of the catalytic treatment is not sufficient. The treatment can effectively be achieved with a molar amount of less than about 1.0 times. When the molar amount is more than about 1.0 times, the titanium trichloride composition uselessly reacts with the halogenated hydrocarbon, which leads to a reduction in the yield of solid titanium trichloride catalyst.

Further, in the catalytic treatment described above, the presence of an ether is essential. The ether used may optionally be selected from those used in the ether treatment described above, and of them, di-n-butyl ether and diisoamyl ether produce particularly preferred results.

The amount of the ether used depends upon the properties of the titanium trichloride compositions and the treatment conditions. The amount is, in general, however, about 0.001 to about 5.0 times on a molar basis, preferably 0.003 to 1.5 times on a molar basis, based on the amount of the titanium trichloride contained in the titanium trichloride composition.

The catalytic treatment of titanium trichloride compositions with a mixture of a halogenated hydrocarbon and an ether is carried out at about 0° to about 150° C., preferably 40° to 100° C. Suitable preferred treating times range between about 5 minutes and about 5 hours.

On the other hand, in the production of composition (c), the ether-treated solid is treated with titanium tetrachloride. Said treatment is carried out in titanium tetrachloride or at least 35 vol% solution of titanium tetrachloride in an inert hydrocarbon solvent. When the concentration of titanium tetrachloride solution is less than 35 vol%, $\beta$-type titanium trichloride composition is easily produced. And, if this composition is used for polymerization of olefins, the CXS cannot be markedly reduced without substantial decrease in the rate of polymerization by use of the unsaturated carboxylic acid ester as a third component. The treating temperature is preferably 50° to 80° C.

The term "treatment" referred to herein means the operations of bringing solid titanium trichloride into contact with a treating agent, and separating the resulting solid by washing and filtration. Suitable washing media which can be used include inert hydrocarbon solvents, for example, those used as a diluent in the description above.

The treating times and treating temperatures referred to herein mean the times and temperatures which are required to bring both into contact with each other, respectively.

Examples of organoaluminum compounds of the general formula $R_2AlX$ (wherein R represents an alkyl group or an aralkyl group, and X represents a halogen atom) which can be used as catalyst component (B) in this invention include diethtylaluminum chloride, diisobutylaluminum chloride, diethylaluminum bromide, and diethylaluminun iodide with diethylaluminum chloride being especially preferred.

Examples of unsaturated carboxylic acid esters which can be used as catalyst component (C) in the present invention are methyl acrylate, methyl methacrylate, methyl maleate, methyl itaconate, ethyl acrylate, butyl acrylate, and butyl methacrylate with methyl methacrylate being especially preferred.

The amounts of the titanium trichloride composition (A), the orgaoaluminum compound (B), and the unsaturated carboxylic acid ester (C) employed are not limited in particular and appropriate amounts can be suitably determined on the basis of the rate of polymerization and the proportion of byproduct soluble polymer, and are not limited in particular. Generally, however, the molar ratio of (C)/(A) (titanium trichloride contained in the composition (A)) is about 0.01:1 to about 2:1, preferably 0.05:1 to 1:1, and the molar ratio of (B)/(A) is about 1:1 to 100:1, preferably 10:1 to 50:1. The concentration of component (B) in the polymerization vessel is preferably about 1 to about 100 millimols/liter.

The sequence of addition of the catalyst components is not particularly limited. However, when components (A) and (C) contact each other directly in the absence of component (B), the activity of the resulting catalyst system tends to be reduced, and the optimal range at which it can be used is narrowed. Thus, this order of addition desirably should be avoided.

Suitable examples of unsaturated hydrocarbon monomers which can be copolymerized with propylene in the present invention are straight chain unsaturated hydrocarbons containing not more than 6 carbon atoms, such as olefins (especially ethylene and $\alpha$-olefins such as 1-butene, 1-pentene, 1-hexene, etc.), and mixtures thereof.

The polymerization conditions for use in this invention, such as the pressure and temperature of the polymerization system, the concentration of a molecular weight controlling agent, the agitation conditions, and the cooling and heating conditions, can be appropriately chosen such that the propylene is maintained in the liquid state, by examining the characteristics (such as the rate of polymerization, or the residence time) of the polymerization system, and the characteristics (for example, the yield of boiling n-heptane-insoluble polymer, melt viscosity, or impact resistance) of the final polymer in comparison with the characteristics of the process.

Specifically, the polymerization reaction can be carried out at a pressure at which the propylene is maintained liquid at a temperature of about 40° to about 90° C., preferably about 10 to about 50 kg/cm$^2$. The reaction time (residence time) is preferably as short as possible. Generally, the reaction time is about 1 to about 10 hours, more generally 2 to 8 hours. At least 8,000 g of a propylene polymer or copolymer per gram of the catalyst component (A) can easily be obtained using the catalyst system in the present invention under the conditions described above.

The polymer slurry obtained in the polymerization is conveniently washed in the manner described below.

Specifically, a countercurrent-type washing tower of the type described in Japanese Patent Application (OPI) No. 102681/75 can be used, and the polymer slurry is contacted in a countercurrent manner with a washing solvent which is fresh liquid propylene, liquid propylene which has been circulated in the polymerization system and purified using some suitable technique, or a mixture thereof. This results in the separation from the polymer slurry of a soluble polymer (consisting mainly of a waxy amorphous propylene polymer or copolymer) dissolved in the slurry, a part of the catalyst remaining in the polymer slurry which is dissolved or precipitated in the slurry, and another extracting solvent mixed prior to the treatment with the propylene as described above.

The following Comparative Examples and Examples are given to illustrate the process of this invention more specifically. It should be noted that the invention is not to be construed as being limited to these examples. Unless otherwise indicated herein, all percents, parts, ratios and the like are by weight.

CXS (%) and pp/cat used in these examples are defined as follows:

CXS (%)

A polymer sample is dissolved in boiling xylene, and the solution is cooled to room temperature (20° C.). The precipitated polymer is separated by filtration. Xylene is evaporated from the filtrate, and the residue is dried at 60° C. under reduced pressure to recover the polymer soluble in cold xylene. CXS (%) is the percentage of the recovered polymer based on the weight of the polymer sample.

pp/cat

The amount in grams of polymer formed per gram of the titanium trichloride composition.

Measurement of Blocking Property

Further, the blocking properties as disclosed herein were determined in accordance with the following.

Two films each having a size of 10 cm×22.5 cm are superposed upon each other and press-adhered using a load of 40 g/cm$^2$ under conditions of a temperature of 60±2° C., a humidity of 65±5% and for a time of 9 hours. These films are then interposed between a pair of clamps having a size of 10 cm×10 cm and each film is fixed along its width direction to each clamp. The clamps are then pulled apart at a rate of 10 g/min., and when the clamps are completely pulled off, the g-value is measured. This value is expressed in terms of g/100 cm$^2$ as blocking property.

EXAMPLE 1

Catalyst Preparation 1 (preparation of a solid reduction product)

The interior of a 1-liter reactor was purged with argon, and charged with 200 cc of dry hexane and 50 cc of titanium tetrachloride. The resulting solution was maintained at −5° C.

Then, a solution of 150 cc of dry hexane and 58 cc of diethylaluminum chloride was added dropwise to the cooled solution under conditions such that the temperature of the reaction system was maintained at −3° C. or below.

After the addition, the mixture was stirred for 30 minutes, and heated to 70° C., followed by stirring the mixture for 1 hour.

The mixture was allowed to stand to separate a solid reduction product using a solid-liquid separation technique. The solid product was washed three times with 200 cc of hexane to obtain 74.0 g of a solid reduction product which contained 4.60% by weight Al.

Catalyst Preparation 2 (preparation of an ether-treated solid)

31.2 g of a solid reduction product prepared as described in Catalyst Preparation 1 above was suspended in 106 cc of dry hexane, and 1.2 mols, per mol of the solid reduction product, of diisoamyl ether was added thereto. The mixture was stirred at 40° C. for 1 hour.

After the reaction, the supernatant liquid was removed, and the residue was washed three times with 100 cc each time of hexane and dried.

Catalyst Preparation 3

12.5 g of the ether-treated solid obtained in Catalyst Preparation 2 above was poured into a solution of 37.5 cc of n-decane and 25.0 cc of ethylaluminum dichloride, and treated at 120° C. for 2 hours.

After the reaction, the supernatant liquid was removed, and the residue was washed three times with 40 cc each time of hexane, and dried. The resulting titanium trichloride contained 4.18% by weight Al and exhibited an X-ray peak characteristic of δ-type titanium trichloride.

Catalyst Preparation 4

9.2 g of the titanium trichloride prepared as described in Catalyst Preparation 3 above was suspended in 46 cc of hexane, and carbon tetrachloride and diisoamyl ether were poured into the suspension so that the mol ratio of the titanium trichloride composition/carbon tetrachloride/diisoamyl ether became 1:0.3:0.5. The titanium trichloride composition was thus treated at 60° C. for 2 hours to produce a titanium trichloride composition (to be referred to hereinafter as Titanium Trichloride Solid Catalyst (A)).

Polymerization 1

A 5-liter stirring-type stainless steel autoclave was purged with nitrogen, and charged with 1 g of diethylaluminum chloride and 50 mg of the Titanium Trichloride Solid Catalyst (A), and hydrogen to a partial pressure of 0.53 kg/cm$^2$ was added.

Then, 1.4 kg of liquid propylene and 17 mg of methyl methacrylate were introduced into the autoclave, and propylene was polymerized for 4 hours while maintaining the autoclave at 70° C.

After the polymerization, the unreacted monomer was removed, and 100 cc of methanol was added to decompose the catalyst.

The polymerization product was separated by filtration on a Buchner funnel, and dried at 60° C. under reduced pressure to obtain 636 g of polypropylene.

The polymerization activity (pp/cat) of the Titanium Trichloride Solid Catalyst (A) was 12,700, and the CXS (%) was 3.3.

COMPARATIVE EXAMPLE 1

Polymerization 1 as described in Example 1 above was repeated except that no methyl methacrylate was added. The polymerization activity (pp/cat) of Titanium Trichloride Solid Catalyst (A) was 12,800, and the CXS (%) was 5.0.

COMPARATIVE EXAMPLES 2 TO 5

Polymerization 1 as described in Example 1 above was repeated except that TiCl$_3$AA (TAC-131, a product of Toho Titanium Co., Ltd.) was used as catalyst component (A), and the amount of methyl methacrylate was changed as shown in Table 1 below. The results, together with those obtained in Example 1 and Comparative Example 1 for reference, are shown in Table 1 below.

COMPARATIVE EXAMPLE 6

Polymerization 1 as described in Example 1 above was repeated except that tributylamine was used instead of methyl methacrylate. The results obtained are also shown in Table 1 below.

TABLE 1

| Run No. | Component (A) | Amount of Component (A) (mg) | Component (B) | Amount of Component (B) (g) | Component (C) | (C)/(A) Molar Ratio | pp/cat | CXS (%) |
|---|---|---|---|---|---|---|---|---|
| Example 1 | Titanium Trichloride Solid Catalyst (A) | 50 | DEAC | 1 | MMA | 0.5 | 12,700 | 3.3 |

TABLE 1-continued

| Run No. | Component (A) | Amount of Component (A) (mg) | Component (B) | Amount of Component (B) (g) | Component (C) | (C)/(A) Molar Ratio | pp/cat | CXS (%) |
|---|---|---|---|---|---|---|---|---|
| Comparative Example 1 | Titanium Trichloride Solid Catalyst (A) | 50 | " | 1 | " | — | 12,800 | 5.0 |
| Comparative Example 2 | TiCl₃AA | 200 | " | 1 | " | 0.5 | 2,120 | 5.4 |
| Comparative Example 3 | " | 50 | " | 1 | " | — | 3,320 | 7.8 |
| Comparative Example 4 | " | 50 | " | 1 | " | 1.0 | 2,600 | 6.8 |
| Comparative Example 5 | " | 50 | " | 1 | " | 0.5 | 3,080 | 7.1 |
| Comparative Example 6 | Titanium Trichloride Solid Catalyst (A) | 50 | " | 1 | Tributylamine | 0.5 | 4,600 | 4.8 |

Note:
DEAC: Diethylaluminum chloride
MMA: Methyl methacrylate

EXAMPLE 2

Catalyst Preparation 1

To a solution of 100 cc of dry xylene and 30 cc of ethylaluminum dichloride was added 0.25 mol, per mol of ethylaluminum dichloride, of benzyl chloride. Then, 32.6 g of an ether-treated solid prepared in accordance with Catalyst Preparation 2 as described in Example 1 was poured into the mixture. The mixture was stirred at 120° C. for 2 hours.

After the reaction, the mixture was allowed to stand. The supernatant liquid was removed, and the residue was washed twice with 100 cc each time of toluene and then twice with 100 cc each time of hexane, and dried.

Catalyst Preparation 2

9.5 g of titanium trichloride prepared by Catalyst Preparation 1 as described in Example 2 was suspended in 47.5 cc of dry hexane, and then carbon tetrachloride and diisoamyl ether were added to the suspension so that the molar ratio of titanium trichloride/carbon tetrachloride/diisoamyl ether became 1:0.3:1.0. The titanium trichloride was thus treated at 60° C. for 2 hours to produce δ-type Titanium Trichloride Solid Catalyst (B).

Polymerization of Propylene

Propylene was polymerized by using 50 mg of Titanium Trichloride Solid Catalyst (B) in accordance with Polymerization 1 as described in Example 1. The molar ratio of methyl methacrylate/Titanium Trichloride Solid Catalyst (B) was maintained at 0.1:1, and the polymerization activity (pp/cat) was 13,480.

The polymer obtained was highly stereoregular as evidenced by its CXS (%) of 2.9. The polymer had a bulk density of 0.46 g/cm³ and an intrinsic viscosity [η] of 2.10.

COMPARATIVE EXAMPLE 7

Polymerization was performed in the same manner as in Example 2 except that no methyl methacrylate was added. The pp/cat was as high as 13,720, but the CXS (%) was 4.1 showing a lower degree of stereoregularity than in Example 2.

EXAMPLE 3

δ-Type Titanium Trichloride Solid Catalyst (C) was prepared in the same manner as in Catalyst Preparation 4 as described in Example 1 except that butyl iodide was used instead of carbon tetrachloride, and the molar ratio of titanium trichloride/butyl iodide/diisoamyl ether was changed to 1:0.2:1.

Polymerization of Propylene

Propylene was polymerized using Titanium Trichloride Solid Catalyst (C) in accordance with Polymerization 1 as described in Example 1 except that ethyl itaconate was used instead of methyl methacrylate, and the molar ratio of ethyl itaconate/Titanium Trichloride Solid Catalyst (C) was 0.2:1. The polymerization activity, pp/cat, was 14,210, and the CXS (%) was 2.7.

COMPARATIVE EXAMPLE 8

Propylene was polymerized in the same manner as described in Example 3 except that no ethyl itaconate was used. The pp/cat was 13,960, and the CXS (%) was 4.5.

EXAMPLE 4

Catalyst Preparation 1

113 g of an ether-treated solid prepared by Catalyst Preparation 2 as described in Example 1 was added to a solution of 339 cc of dry heptane and 226 cc of titanium tetrachloride, and treated at 70° C. for 2 hours.

After the reaction, the supernatant liquid was removed, and the residue was washed three times with 300 cc each time of hexane, and dried to obtain δ-type Titanium Trichloride Solid Catalyst (D).

Polymerization of Propylene

Propylene was polymerized using 50 mg of the resulting Titanium Trichloride Solid Catalyst (D) in accordance with Polymerization 1 as described in Example 1. The molar ratio of methyl methacrylate/Titanium Trichloride Solid Catalyst (D) was maintained at 1.0:1. The pp/cat was 11,480, and the CXS (%) was 2.2.

COMPARATIVE EXAMPLE 9

Propylene was polymerized in the same manner as described in Example 4 except that no methyl methacrylate was added. The pp/cat was 13,200, and the CXS (%) was 3.9.

EXAMPLE 5

A 30 m$^3$ polymerization vessel was charged continuously with 1,800 kg/hr of liquid propylene, 25 kg/hr of ethylene, 52 g/hr of Titanium Trichloride Solid Catalyst (D) prepared by Catalyst Preparation 1 as described in Example 4, 350 g/hr of diethylaluminum chloride (a product of Toyo Stauffer Co., Ltd.), and 13 g/hr of methyl methacrylate. While maintaining the interior of the vessel at 60° C., propylene was copolymerized with ethylene in liquid propylene. During the polymerization, the pressure of the interior of the vessel was 25.5 to 26.5 kg/cm$^2$ (gauge). The average concentration of hydrogen as a molecular weight controlling agent in the gaseous phase of the polymerization vessel was 7.5 mol%.

The resulting polymer slurry was fed continuously to the upper portion of a countercurrent-type washing tower through a level-adjusting valve. The amount of the polymer slurry fed was the sum of 680 kg/hr of the copolymer (including insoluble copolymer and by-product soluble polymer) and 1,120 kg/hr of liquid propylene containing a part of the soluble polymer.

Purified liquid propylene which did not contain a soluble polymer or other impurities was continuously fed as a washing solvent at a rate of 1,500 kg/hr to the bottom portion of the countercurrent-type washing tower through a line while the temperature in the tower was being maintained at 52° to 55° C. The contents inside the tower were stirred at a low rate of 12 rpm. Propylene oxide as a catalyst deactivating agent was fed at a flow rate of 150 g/hr from a side pipe leading to the line feeding the polymer slurry to the washing tower.

During this time, the pressure of the interior of the tower was 23.5 to 24.2 kg/cm$^2$ (gauge) and was quite stable.

The polymer which deposited on the bottom of the tower was withdrawn continuously into a flash tank through a pressure-reducing valve interlocked with the level-adjusting valve.

The overflowing liquid discharged from the top of the tower was introduced into a flash evaporator whereby the liquid propylene was vaporized to separate and recover the dissolved soluble polymer by a flash vessel, and then led to a purification step.

The liquid propylene was evaporated in the flash tank to afford 670 kg/hr of a powdery polymer. The polymer was dried at 90° C. and 5 to 10 mmHg (absolute) or less for 10 hours, and weighed. The amount of polymer was found to be 660 kg/hr.

The CXS (%) of this powdery polymer was as low as 4.2%, and films prepared from the polymer had reduced blocking and, therefore, had a high commercial value.

The countercurrent-type washing tower used had a diameter of 600 mm and a height of 8,200 mm and contained ten stages of frustoconical rotary vanes for agitation.

COMPARATIVE EXAMPLE 10

The procedures described in Example 5 were repeated except that no methyl methacrylate was added to the catalyst system. A powdery polymer was obtained at a rate of 700 kg/hr. The polymer had a CXS (%) of as high as 7.5, and films prepared from the polymer had a large degree of blocking and a lower commercial value than the films produced using the polymer prepared in Example 5.

COMPARATIVE EXAMPLE 11

Catalyst Preparation

The interior of a 1-liter flask was purged with argon, and charged with 200 ml of dry hexane and 88.5 g of titanium tetrachloride. The resulting solution was maintained at 0° C.

Then, a solution of 100 ml of dry hexane and 26.1 g of diethylaluminum chloride was added dropwise to the cooled solution over a 2 hour period during which time the temperature of the reaction system was maintained at 0° C.

After the addition, the mixture was stirred for 30 minutes, and heated to 40° C., followed by stirring the mixture for 5 hours.

The mixture was allowed to stand and a solid reduction product was separated using a solid-liquid separation technique. The solid product was washed four times with 200 ml of hexane. The solid product was dried under reduced pressure at room temperature.

A 500 ml flask equipped with a stirrer, a thermometer, an inlet for argon and an outlet for waste gas was charged with 50 g of the solid product and 300 ml of toluene were added thereto.

Then, the temperature was increased to 70° C. under agitation, following which 26 g of anisole was added and an extraction was conducted at 70° C. for 2 hours. The extract and the extraction residue were separated in an argon atmosphere with a G-3 glass filter, and the extraction residue on the filter was washed three times with 150 ml of toluene and dried under reduced pressure. The catalyst thus-obtained is referred to hereinafter as Titanium Trichloride Solid Catalyst (E).

Polymerization

A 5-liter stirring-type stainless steel autoclave was purged with nitrogen, and charged with 1 g of diethylaluminum chloride and 50 mg of the Titanium Trichloride Solid Catalyst (E) and hydrogen to a partial pressure of 0.53 kg/cm$^2$ was added.

Then, 1.4 kg of liquid propylene and 17 mg of methyl methacrylate were introduced under pressure into the autoclave, and propylene was polymerized for 4 hours while maintaining the autoclave at 70° C.

After the polymerization, the unreacted monomer was removed and 100 ml of methanol was added to decompose the catalyst. The polymerization product was separated by filtration on a Buchner funnel, and dried at 60° C. under reduced pressure.

The weight of the polymer was measured and the results obtained are shown in Table 2.

COMPARATIVE EXAMPLE 12

The polymerization in Comparative Example 11 was repeated except no methyl methacrylate was added. The results obtained are shown in Table 2.

COMPARATIVE EXAMPLE 13

Catalyst Preparation 24.6 ml of dry hexane and 12.5 ml of titanium tetrachloride were added to a 300 ml round bottom flask. The flask and its contents were protected under blanket of dry argon throughout the preparation. The solution was stirred and cooled in an ice bath maintained at −1° C.

74.8 ml of diethylaluminum chloride in hexane (24.4 wt% diethylaluminum chloride) was added dropwise to the titanium tetrachloride solution over a three hour period.

After the diethylaluminum chloride addition was complete, the slurry was stirred at −1° C. for 15 minutes, fitted with a condenser, and then heated to 62° C. within one hour. The slurry was stirred at 62° C. for 1 hour.

After cooling to room temperature, the solid was washed with five 42 ml portions of dry hexane by decantation. The solid was decanted, 144 ml of dry hexane and 21.3 ml diisopentyl ether added, and the slurry stirred at 35° C. for 1 hour. The solid was then washed with five 42 ml portions of dry hexane by decantation.

70.8 ml of a 20.3 volume percent stock solution of titanium tetrachloride in hexane was added to the decanted solid. The slurry was stirred at 62° C. for 2 hours and cooled to room temperature. The solid was washed with five 42 ml portions of dry hexane by decantation and dried at room temperature under reduced pressure.

The solid catalyst thus-obtained is referred to hereinafter as Titanium Trichloride Solid Catalyst (F).

Polymerization

Polymerization was carried out in the same manner as described in Example 1 except Titanium Trichloride Solid Catalyst (F) was used. The results obtained are also shown in Table 2.

COMPARATIVE EXAMPLE 14

The polymerization in Comparative Example 13 was repeated except no methyl methacrylate was added. The results obtained are shown in Table 2.

diethylaluminum chloride, and 19 mg of methyl acrylate were used. The results obtained are shown in Table 3.

EXAMPLE 7

Polymerization was carried out in the same manner as in Example 6 except that 1 g of diethylaluminum chloride and 9.2 mg of methyl maleate were used. The results obtained are shown in Table 3.

EXAMPLE 8

Polymerization was carried out in the same manner as in Example 6 except 0.58 g of diethylaluminum chloride and 9.6 mg of ethyl acrylate were used. The results obtained are shown in Table 3.

EXAMPLE 9

Polymerization was carried out in the same manner as in Example 6 except that 1.2 g of diethylaluminum chloride and 82 mg of butyl acrylate were used. The results obtained are shown in Table 3.

COMPARATIVE EXAMPLE 15

Polymerization was carried out in the same manner as in Polymerization 1 of Example 6 except that 11 mg of tetramethyl urea as a third component was used. The results obtained are shown in Table 3.

EXAMPLE 10

Polymerization was carried out in the same manner as in Polymerization 1 of Example 6 except that 50 mg of δ-type Titanium Trichloride Solid Catalyst (D) prepared in Example 4 and 1.6 mg of methyl methacrylate were used. The results obtained are shown in Table 3.

EXAMPLE 11

Polymerization was carried out in the same manner as

TABLE 2

| Run No. | Component (A) | Amount of Component (A) (mg) | Component (B) | Amount of Component (B) (g) | Component (C) | (C)/(A) Molar Ratio | pp/cat | CXS (%) |
|---|---|---|---|---|---|---|---|---|
| Comparative Example 11 | Titanium Trichloride Solid Catayst (E) | 50 | DEAC | 1 | MMA | 0.5 | 1,160 | 10 |
| Comparative Example 12 | Titanium Trichloride Solid Catalyst (E) | 50 | " | 1 | — | — | 1,720 | 15 |
| Comparative Example 13 | Titanium Trichloride Solid Catalyst (F) | 50 | " | 1 | MMA | 0.5 | 6,810 | 4.8 |
| Comparative Example 14 | Titanium Trichloride Solid Catalyst (F) | 50 | " | 1 | — | — | 7,920 | 6.5 |

Notes:
DEAC: Diethylaluminum chloride
MMA: Methyl methacrylate

EXAMPLE 6

Polymerization was carried out in the same manner as in Polymerization 1 of Example 1 except that 0.75 g of in Example 10 except using 50 mg of methyl methacrylate. The results obtained are shown in Table 3.

TABLE 3

| Run No. | Component (A) | Amount of Component (A) (mg) | Component (B) | Amount of Component (B) (g) | (B)/(A) Molar Ratio | Component (C) | Amount of Component (C) (mg) | (C)/(A) Molar Ratio | pp/cat | CXS (%) |
|---|---|---|---|---|---|---|---|---|---|---|
| Example 6 | Titanium trichloride Solid Catalyst (A) | 50 | DEAC | 0.75 | 20 | MA | 19 | 0.7 | 12,400 | 3.8 |
| Example 7 | Titanium trichloride Solid Catalyst (A) | 50 | " | 1 | 25 | MM | 9.2 | 0.2 | 12,100 | 3.5 |
| Example 8 | Titanium trichloride Solid Catalyst (A) | 50 | " | 0.58 | 15 | EA | 9.6 | 0.3 | 12,500 | 3.9 |
| Example 9 | Titanium trichloride Solid Catalyst (A) | 50 | " | 1.2 | 30 | BA | 82 | 2 | 11,900 | 3.1 |
| Comparative Example 15 | Titanium trichloride Solid Catalyst (A) | 50 | " | 1 | 25 | TU | 11 | 0.3 | 5,200 | 4.5 |
| Example 10 | Titanium Trichloride Solid Catalyst (D) | 50 | " | 0.5 | 13 | MMA | 1.6 | 0.05 | 12,900 | 3.0 |
| Example 11 | Titanium Trichloride Solid Catalyst (D) | 50 | " | 1.2 | 30 | MMA | 50 | 1.5 | 11,500 | 2.0 |

Notes:
DEAC: Diethylaluminum chloride,
MA: Methyl acrylate,
MM: Methyl maleate,
EA: Ethyl acrylate,
TU: Tetramethyl urea,
MMA: Methyl methacrylate
BA: Butyl acrylate.

COMPARATIVE EXAMPLE 16

A 5-liter stirring-type stainless steel autoclave was purged with nitrogen, and charged with 1 g of diethylaluminum chloride, 510 mg of TiCl$_3$AA (TAC-131, a product of Toho Titanium Co., Ltd.) and 20 mg of methyl methacrylate, and hydrogen to a partial pressure of 0.53 kg/cm$^2$ was added.

Then, 2 kg of liquid propylene was charged into the autoclave and the polymerization was carried out for 2 hours while maintaining the autoclave at 70° C. After the polymerization, the unreacted monomer was removed, and 100 cc of methanol was added to decompose the catalyst. The polymerized product was separated by filtration on a Buchner funnel, and dried at 60° C. under reduced pressure to obtain 946 g of polypropylene. The results obtained are shown in Table 4.

COMPARATIVE EXAMPLE 17

Polymerization was carried out in the same manner as in Comparative Example 16 except that 80 mg of methyl methacrylate was used. 801 g of polypropylene was obtained. The results obtained are shown in Table 4.

COMPARATIVE EXAMPLE 18

Polymerization was carried out in the same manner as in Comparative Example 16 except no methyl methacrylate was used. 971 g of polypropylene was obtained. The results obtained are shown in Table 4.

COMPARATIVE EXAMPLE 19

Titanium Trichloride Solid Catalyst (G) was prepared in the same manner as in Catalyst Preparation 4 of Example 1 except chlorobenzene was used instead of carbon tetrachloride. Polymerization was carried out in the same manner as in Polymerization 1 of Example 1 except using Titanium Trichloride Solid Catalyst (G). The results obtained are shown in Table 4.

EXAMPLE 12

Titanium Trichloride Solid Catalyst (H) was prepared in the same manner as in Catalyst Preparation 4 of Example 1 except chloroform was used instead of carbon tetrachloride. Polymerization was carried out in the same manner as in Polymerization 1 of Example 1. The results obtained are shown in Table 4.

COMPARATIVE EXAMPLE 20

Polymerization was carried out in the same manner as in Comparative Example 19 except using no methyl methacrylate. The results obtained are shown in Table 4.

COMPARATIVE EXAMPLE 21

Polymerization was carried out in the same manner as in Example 12 except using no methyl methacrylate. The results obtained are shown in Table 4.

TABLE 4

| Run No. | Component (A) | Amount of Component (A) (mg) | Component (B) | Amount of Component (B) (g) | (B)/(A) Molar Ratio | Component (C) | Amount of Component (C) (mg) | (C)/(A) Molar Ratio | pp/cat | CXS (%) |
|---|---|---|---|---|---|---|---|---|---|---|
| Comparative Example 16 | TiCl$_3$AA | 510 | DEAC | 1 | 3.2 | MMA | 20 | 0.08 | 1,854 | 7.3 |
| Comparative Example 17 | " | 510 | " | 1 | 3.2 | MMA | 80 | 0.32 | 1,570 | 6.3 |
| Comparative Example 18 | " | 510 | " | 1 | 3.2 | — | — | — | 1,903 | 7.5 |
| Comparative Example 19 | Titanium Trichloride Solid Catalyst (G) | 50 | " | 1 | 25 | MMA | 17 | 0.5 | 6,300 | 5.8 |
| Comparative Example 20 | Titanium Trichloride Solid Catalyst (G) | 50 | " | 1 | 25 | — | — | — | 7,200 | 6.3 |
| Example 12 | Titanium Trichloride Solid Catalyst (H) | 50 | " | 1 | 25 | MMA | 17 | 0.5 | 11,300 | 3.5 |
| Comparative Example 21 | Titanium Trichloride Solid Catalyst (H) | 50 | " | 1 | 25 | — | — | — | 11,500 | 4.6 |

Note:
DEAC: Diethylaluminum chloride
MMA: Methyl methacrylate

While the invention has been described in detail and with reference to specific embodiments thereof, it will be apparent to one skilled in the art that various changes and modifications can be made therein without departing from the spirit and scope thereof.

What is claimed is:

1. A process for producing a propylene polymer or copolymer which comprises polymerizing (a) propylene or (b) a mixture of propylene and another unsaturated hydrocarbon monomer in liquid propylene in the presence of a catalyst system of
    (A) a titanium trichloride composition;
    (B) an organoaluminum compound having the general formula:

$$R_2AlX$$

wherein R represents an alkyl group or an aralkyl group, each containing up to 18 carbon atoms, and X represents a halogen atom; and
    (C) an unsaturated carboxylic acid ester selected from the group consisting of methyl acrylate, methyl methacrylate, methyl maleate, methyl itaconate, ethyl acrylate, butyl acrylate and butyl methacrylate;

while adjusting the amount of the polymer produced to at least 8,000 g per gram of the titanium trichloride composition, wherein the molar ratios of unsaturated carboxylic acid ester (C) and organoaluminum compound (B) to titanium trichloride composition (A) are 0.01–2:1 and 1–100:1, respectively, and the titanium trichloride composition (A) is a composition obtained by reducing titanium tetrachloride with an organoaluminum compound of the general formula:

$$R'_nAlX'_{3-n}$$

wherein R' represents a straight chain or branched chain alkyl group, an alicyclic hydrocarbon group or an aromatic hydrocarbon group, each containing up to 18 carbon atoms, X' represents a halogen atom or a hydrogen atom, and n is a number of $1 \leq n \leq 3$, at a temperature of about $-100°$ C. to about $60°$ C.; treating the resulting solid reduction product with an ether in an amount of about 0.05 to 3 times by mole based on the titanium trichloride contained in the solid product at a temperature of about $0°$ to $100°$ C.; contacting the resulting ether-treated solid with an aluminum compound having the general formula:

$$R''_pAlX_{3-p}$$

wherein R'' represents a straight chain or branched chain alkyl group, an alicyclic hydrocarbon group or an aromatic hydrocarbon group, each containing up to 18 carbon atoms, X represents a halogen atom, and p is a number of $1 \leq p < 1.5$ in an amount of about 0.1 to 10 times by mole based on the titanium trichloride contained in the ether-treated solid at about room temperature to about $200°$ C.; and thereafter contacting the aluminum compound-treated solid with a mixture of a halogenated hydrocarbon of the general formula:

$$CH_qX_{4-q}$$

wherein X is a halogen atom and q is an integer satisfying the relationship $0 \leq q < 4$; and an ether in amounts of 0.001 to 1.0 and 0.001 to 5 times by mole based on the titanium trichloride contained in the aluminum compound-treated solid, respectively.

2. A process for producing a propylene polymer or copolymer which comprises polymerizing (a) propylene or (b) a mixture of propylene and another unsaturated hydrocarbon monomer in liquid propylene in the presence of a catalyst system of
    (A) a titanium trichloride composition;
    (B) an organoaluminum compound having the general formula:

$$R_2AlX$$

wherein R represents an alkyl group or an aralkyl group, each containing up to 18 carbon atoms, and X represents a halogen atom; and
(C) an unsaturated carboxylic acid ester selected from the group consisting of methyl acrylate, methyl methacrylate, methyl maleate, methyl itaconate, ethyl acrylate, butyl acrylate and butyl methacrylate;

while adjusting the amount of the polymer produced to at least 8,000 g per gram of the titanium trichloride composition, wherein the molar ratios of unsaturated carboxylic acid ester (C) and organoaluminum compound (B) to titanium trichloride composition (A) are 0.01–2:1 and 1–100:1, respectively, and the titanium trichloride composition (A) is a composition obtained by reducing titanium tetrachloride with an organoaluminum compound of the general formula:

$$R'_n AlX'_{3-n}$$

wherein R' represents a straight chain or branched chain alkyl group, an alicyclic hydrocarbon group or an aromatic hydrocarbon group, each containing up to 18 carbon atoms, X' represents a halogen atom or a hydrogen atom, and n is a number of $1 \leq n \leq 3$, at a temperature of about $-100°$ to $60°$ C.; treating the resulting solid reduction product with an ether in an amount of about 0.05 to 3 times by mole based on the titanium trichloride contained in the solid product, at a temperature of about $0°$ to $100°$ C.; contacting the resulting ether-treated solid with an aluminum compound of the general formula:

$$R''_p AlX_{3-p}$$

wherein R" represents a straight chain or branched chain alkyl group, an alicyclic hydrocarbon group or an aromatic hydrocarbon group, each containing up to 18 carbon atoms, X represents a halogen atom, and p is a number of $1 \leq p < 1.5$, in an amount of about 0.1 to 10 times by mole based on the titanium trichloride contained in the ether-treated solid in the presence of an organic halogen compound of the general formula:

$$R'''X$$

wherein R''' represents a straight chain alkyl group, an alicyclic hydrocarbon group or an aromatic hydrocarbon group, each containing up to 18 carbon atoms, and X represents a halogen atom in an amount of 0.01 to 1 mole per mole of the aluminum compound; and thereafter contacting the resulting solid with a mixture of a halogenated hydrocarbon of the general formula:

$$Ti\ CH_q X_{4-q}$$

wherein X is a halogen atom and q is an integer satisfying the relationship $0 \leq q < 4$, and an ether in amounts of 0.001 to 1.0 and 0.001 to 5 times by mole based on the titanium trichloride contained in the aluminum compound-treated solid, respectively.

3. The process of claim 1 or 2, wherein the ether used in said ether-treatment and said halogenated hydrocarbon-ether mixture-treatment is a compound represented by the formula:

$$R_1-O-R_2$$

wherein $R_1$ and $R_2$, which may be the same or different, each is a straight or branched alkyl group, an alicyclic group or an aromatic hydrocarbon group, each having up to 10 carbon atoms.

4. The process of claim 3, wherein the ether is a member selected from the group consisting of diethyl ether, di-n-propyl ether, diisopropyl ether, di-n-butyl ether, diisoamyl ether, dineopentyl ether, di-n-hexyl ether, di-n-octyl ether, diphenyl ether, di-o-tolyl ether, di-p-tolyl ether, and dicyclohexyl ether.

5. The process of claim 4, wherein the ether is di-n-butyl ether or diisoamyl ether.

6. The process of claim 1 or 2, wherein the unsaturated carboxylic acid ester (C) is methyl methacrylate.

7. The process of claim 1 or 2, wherein the unsaturated hydrocarbon monomer copolymerizable therewith is ethylene.

* * * * *